United States Patent

Nordlund

Patent Number: 6,112,093
Date of Patent: Aug. 29, 2000

[54] RADIO COMMUNICATION SYSTEM AND METHOD FOR ANALOG AND DIGITAL TRAFFIC CHANNEL ALLOCATION USING A SECOND HIGHER THRESHOLD WHEN ALLOCATING A DIGITAL CHANNEL

[75] Inventor: Peter Nordlund, Bromma, Sweden

[73] Assignee: Telefonaktiebolaget LM Ericsson, Stockholm, Sweden

[21] Appl. No.: 08/675,483

[22] Filed: Jul. 3, 1996

[51] Int. Cl.[7] ............................... H04Q 7/00; H24Q 9/00
[52] U.S. Cl. .................... 455/450; 455/513; 455/553; 370/332
[58] Field of Search ...................... 455/89, 34.1, 54.1, 455/54.2, 56.1, 33.1, 33.2, 575, 450, 509, 552, 553, 524, 513; 370/329–332; 379/60

[56] References Cited

U.S. PATENT DOCUMENTS

| | | | |
|---|---|---|---|
| 5,119,397 | 6/1992 | Dahlin et al. | 375/5 |
| 5,175,867 | 12/1992 | Wejke et al. | 455/33.1 |
| 5,241,685 | 8/1993 | Bodin et al. | 455/33.2 |
| 5,257,401 | 10/1993 | Dahlin et al. | 455/33.2 |
| 5,420,911 | 5/1995 | Dahlin et al. | 379/59 |
| 5,434,853 | 7/1995 | Hemmady et al. | 370/60 |
| 5,499,386 | 3/1996 | Karlsson | 455/33.2 |
| 5,509,035 | 4/1996 | Teidermann, Jr. et al. | 375/356 |
| 5,542,093 | 7/1996 | Bodin et al. | 455/33.2 |

FOREIGN PATENT DOCUMENTS

| | | |
|---|---|---|
| WO94/05130 | 3/1994 | WIPO . |
| WO94/08434 | 4/1994 | WIPO . |
| WO94/13069 | 6/1994 | WIPO . |
| WO95/24810 | 9/1995 | WIPO . |

OTHER PUBLICATIONS

Standard European Search Report re RS 97776 date of completion of search: Jan. 27, 1997.
"Ericsson Internal Training Manual", dated Dec. 12, 1992, pp. 111–173.

*Primary Examiner*—Douglas W. Olms
*Assistant Examiner*—David R Vincent
*Attorney, Agent, or Firm*—Burns, Doane, Swecker & Mathis, L.L.P.

[57] ABSTRACT

The establishment of digital connections is avoided if the power level compensated uplink signal strength transmitted by a dual-mode mobile station is below a threshold value. In such cases, a dual-mode mobile station is instead preferably connected to an analog traffic channel. The threshold value can be selected to provide a statistically acceptable probability that the digital connection will be successful. Different threshold values can be used for different connection situations to take into account the different techniques used to determine a best serving base station.

20 Claims, 5 Drawing Sheets

RADIO COMMUNICATION SYSTEM AND METHOD FOR ANALOG AND DIGITAL TRAFFIC CHANNEL ALLOCATION USING A SECOND HIGHER THRESHOLD WHEN ALLOCATING A DIGITAL CHANNEL

BACKGROUND

The present invention relates generally to radiocommunication systems. More particularly, the present invention relates to methods and apparatuses for determining whether to assign an analog or a digital traffic channel to a connection at various decision points, e.g., at call set-up or call handoff.

Conventional cellular mobile radio telephone systems include a land system and many mobile stations. The land system typically includes at least one mobile switching center and a number of radio base stations which are distributed over a geographical area. Each radio base station serves a cell, i.e. a part of the geographical area, by sending and receiving information to and from mobile stations over radio channels. The mobile switching center, connected on one side to the public switching telephone network and on the other to the radio base stations, performs most of the control functions required for calls to and from the mobile stations in the geographical area.

Due to the rapid growth in the number of subscribers requesting radiocommunication service, system demand is rapidly outstripping system capacity, particularly in urban areas. To satisfy this increasing demand for radiocommunication service, system designers have, among other things, implemented technological advances to increase system capacity. For example, while the first radiocommunication systems implemented in the U.S. were analog systems (i.e., systems using analog modulation), more recent systems have been implemented using digital technology to increase system capacity per unit bandwidth.

This evolution in the technology used to provide radiocommunication service has given rise to hybrid mobile stations which are capable of communicating with either analog or digital land systems. Such mobile stations are commonly referred to as "dual-mode" mobile stations. In some geographic areas, digital system service overlaps analog system service, i.e., both analog and digital traffic channels are available to connect mobile stations to a land system to provide radiocommunication service. In such areas, dual-mode mobile stations can either be connected to the land system via an analog traffic channel or a digital traffic channel.

When a mobile station is to be connected to the land system, the land system will identify a traffic channel to handle the connection. A channel can, for example, comprise a pair of frequencies (i.e., in an analog system) or a repeating sequence of timeslots on a pair of frequencies (i.e., in a digital system). This process is typically referred to as channel allocation. For a dual-mode mobile station which is physically located in a geographic area having overlapping analog and digital service, the land system will first decide which type of channel (analog or digital) to allocate to the dual-mode mobile station. Conventionally, this initial selection can be made by defaulting to digital traffic channels. That is, if a mobile station's equipment supports digital communication, then that mobile station will be connected to a digital traffic channel (when available). Alternatively, if the subscriber's equipment only supports analog communication, then that mobile station will be connected to an analog traffic channel. After being allocated to a particular analog or digital traffic channel, the mobile station will be informed of the allocated channel and tune to the corresponding frequencies to receive and transmit radio signals.

Because cells in a radio communication system are typically relatively small, mobile stations often travel between a number of different cells. The process of switching an established connection from a currently serving base station in one cell, to a target base station in another cell, is known as handoff. In existing analog systems, a serving base station determines the need for a handoff of a mobile station whose connection it is handling based on periodic measurements of the signal strength and/or signal quality of the uplink voice channel signals received from that mobile station. If the measured signal strength and/or signal quality is below a predetermined level, the serving base station sends a handoff request to the mobile switching center. The mobile switching center queries neighboring base stations for reports of the previously measured signal strength of signals on the voice channel currently being used by the mobile station. The mobile switching center selects the neighboring base station reporting the strongest signal, provided that the reported signal strength is above a threshold, and transmits appropriate commands to that neighboring base station and to the mobile station via the serving base station to implement the handoff on the same or a different traffic channel.

In dual-mode systems, as specified for example in the EIA/TIA IS-54 standard, handoffs from a digital traffic channel may also be implemented using a Mobile-Assisted Handoff (MAHO) procedure. Using this procedure, a mobile station may be ordered by the land system to measure and report signal strength and/or other parameters of digital radio channels emitted by the serving base station, as well as those emitted by neighbor base stations. This enables handoff decisions made by the land system to be based not only on the measured signal strength and other parameters of the uplink signal received from the mobile station, but also on the downlink signal parameters detected by the mobile station on channels associated with the serving and neighbor base stations. However, when performing a handoff from an analog traffic channel (to either another analog traffic channel or a digital traffic channel), MAHO techniques cannot be used because the mobile station cannot measure signal strength or other signal parameters since the analog traffic channel is continuously monitored, i.e., there is no idle time for measurement.

These conventional techniques for allocating traffic channels at call-setup and call handoff have proven to be problematic for dual-mode mobile stations operating, for example, in geographic areas where digital systems have been migrated or overlaid onto existing analog systems. The different techniques described above to allocate traffic channels in different traffic situations result in widely varying connection reliability. For example, the Applicant has observed that handoffs between analog traffic channels (i.e., analog-to-analog handoffs) have about a 0.5% average connection failure rate, while handoffs from an analog traffic channel to a digital traffic channel have about a 7% average connection failure rate. By way of contrast, handoffs from digital traffic channels (using MAHO) to digital traffic channels have, about a 1% average connection failure rate. Similarly, call set-ups to digital traffic channels have been observed to have about a 2.5% failure rate, while call set-ups to analog traffic channels have only about a 0.7% failure rate.

Considering the above-described differences between connection failure rates for these different traffic cases, it is noted that analog channels can be read simply by tuning to the correct frequency, whereas reading digital channels also requires synchronization to the digital structure of that channel. The increased complexity associated with reading a digital traffic channel can be partially compensated by using MAHO when the handoff is performed from a digital traffic channel. Accordingly, it would be desirable for a system designer and/or a system operator to have the capability to adjust the connection failure rates to suit her or his preferred system design.

SUMMARY

According to the present invention, the establishment of digital connections is avoided if the power level compensated uplink signal strength received by the target base station is below a threshold value. In such cases, a dual-mode mobile station is instead preferably connected to an analog traffic channel if available from the target base station. The threshold value can be selected to provide a statistically acceptable probability that the digital connection will be successful. Different threshold values can be used for different connection situations to take into account the different techniques used to determine a best serving base station.

For example, one threshold value can be used to determine whether a digital traffic channel shall be allocated at call-setup. When a user initiates a call from his or her mobile station, or when a mobile station is paged from the land system, a traffic channel needs to be allocated to support the connection. If the uplink signal strength measured by the base station on signals transmitted by the mobile station on the reverse control channel exceeds a digital channel call-setup threshold, then a digital traffic channel is allocated. Otherwise an analog traffic channel is allocated, if available.

Similarly, various threshold values can be established for selectively handing off an established connection to a digital traffic channel. For example, if a mobile station is currently using an analog traffic channel whose signal quality has unacceptably degraded, the land system will identify a best handover candidate. If the uplink signal strength measured by the handover candidate base station for the mobile station of interest is above a threshold for analog-to-digital (A-D) handoff, then the land system will select an digital traffic channel associated with the new base station for the handoff. Otherwise, an analog traffic channel is allocated, if available.

Just as different thresholds can be used for call-setup and A-D handoff, so too can a different threshold be used for handoffs from digital traffic channels, e.g., digital-to-digital handoffs and digital-to-analog handoffs. In this way, the connection failure rate associated with each different traffic case can be individually controlled to achieve a desired design objection, e.g., approximately equal connection failure rates.

According to other exemplary embodiments, the thresholds can be variable in nature to adapt to changing traffic conditions. For example, if the amount of digital traffic increases to near capacity in an area serviced by both digital and analog systems, the call-setup threshold associated with digital traffic channels could be increased so that more dual-mode mobile stations use analog traffic channels. Alternatively, if the amount of analog traffic increases substantially then it may be desirable to reduce the call-setup threshold associated with digital traffic channels.

According to other exemplary embodiments, it may not be desirable to individually specify thresholds for all of the various different traffic cases. For example, one threshold could be used both for digital call-setup and for handoffs from analog to digital traffic channels. These embodiments of the present invention recognize the tradeoff between greater control of system performance and greater system complexity. For example, in certain systems it may be undesirable to specify a threshold for handoffs from one digital traffic channel to another digital traffic channel to avoid a proliferation of handoffs.

BRIEF DESCRIPTION OF THE DRAWINGS

The foregoing, and other, objects, features and advantages of the present invention will be more readily understood by those skilled in the art upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

The following description refers to measurements of the "uplink signal strength" transmitted by a mobile station or received by a base station. Preferably, the comparisons with thresholds described herein are made using what is commonly referred to as the "power level compensated uplink signal strength". This phrase refers to adjusting the actual received signal strength based on the power level at which the mobile station is transmitting to normalize the comparisons.

Figure 1:
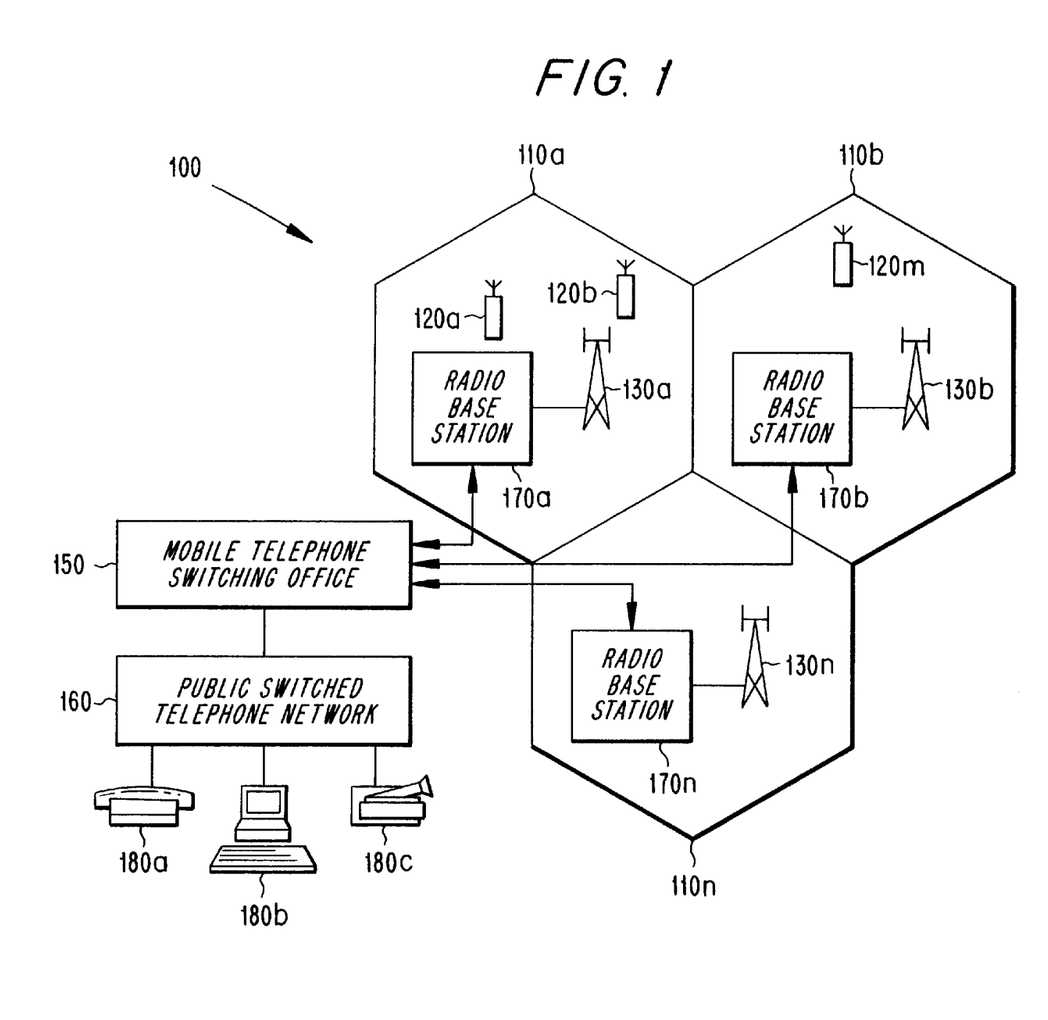
FIG. 1 shows a conventional cellular radiocommunication system.

An exemplary cellular radio communication system 100 is generally illustrated in FIG. 1. A geographic region served by the system 100 may be subdivided into a number, n, of smaller regions of radio coverage known as cells 110a–n, each cell 110a–n having associated with it a respective radio base station 170a–n. Each radio base station 170a–n has associated with it an antenna system 130a–n where inter alia the transmit and receive antennas are located. The use of hexagonally-shaped cells 110a–n is a graphically convenient way of illustrating areas of radio coverage associated with base stations 170a–n respectively. In actuality, cells 110a–n may be irregularly shaped, overlapping, and not necessarily contiguous. Sectorization within cells 110a–n is also possible and contemplated by the present invention.

Distributed within cells 110a–n are a plurality of mobile stations 120a–m. Base stations 170a–n provide two-way radio communication with mobile stations 120a–m located within corresponding cells 110a–n respectively. Generally, the number, m, of mobile stations is vastly greater than the number, n, of radio base stations. Radio base stations 170a–n are coupled to the mobile telephone switching office (MTSO) 150 which provides inter alia a connection to the public switched telephone network (PSTN) 160 and henceforth to communication devices 180a–c. This basic cellular radiocommunication concept is known in the art and will not be further described here. Moreover, the circuitry used to implement the various stations illustrated in FIG. 1 is also well known to those skilled in the art. However, the interested reader's attention is directed to U.S. Pat. Nos. 5,119, 397 and 5,420,911 (both of which have been granted to Dahlin et al.) for examples of mobile and base stations which can be used to implement the present invention. The disclosures of these two U.S. patents are expressly incorporated here by reference.

The cellular radio communication system illustrated in FIG. 1 includes a plurality of radio channels used for communication. The system can be designed to communicate both analog information, e.g., speech, digitized analog information, e.g., digitized speech, and pure digital information, e.g., pure digital data. Thus a connection may, for example, be a call where two people talk to each other, but may also be a data communication channel where computers exchange data.

Each system is assigned a particular frequency band over which it can operate. Within its assigned frequency band, a set of communication channels is allocated to each cell. For example, between 10 and 30 different traffic channels and one control channel may be allocated to any given cell. The traffic channels are used to establish point-to-point communication channels between mobile stations and the land system. The control channel is used to communicate system overhead information and as a channel for initiating a connection between mobile stations and the land system.

As mentioned above, the present invention is primarily concerned with geographic areas in which both analog and digital service exist. This type of situation can arise, for example, by way of digital migration or digital overlay. The phrase "digital migration" refers to the case where a system is designed from the beginning as an analog/digital hybrid that supports both analog and digital mobile equipment and wherein it is anticipated that subscribers will gradually migrate from analog mobile to digital technology over time. In these types of systems, the analog and digital equipment is located at a common site and the cell areas are the same for both the analog and digital systems.

Another way in which analog and digital service can co-exist is by way of digital overlay. The phrase "digital overlay" refers to the case where a separate digital system is installed in a geographic area that already contains an analog system. This means that the digital system will typically include its own MTSO and its own base stations, unlike the hybrid systems created by digital migration where the analog and digital systems utilize much of the same equipment. Accordingly, in areas where digital service is provided by digital overlay, the digital cells may each cover the same, greater or smaller areas than the analog cells.

Figure 2A:
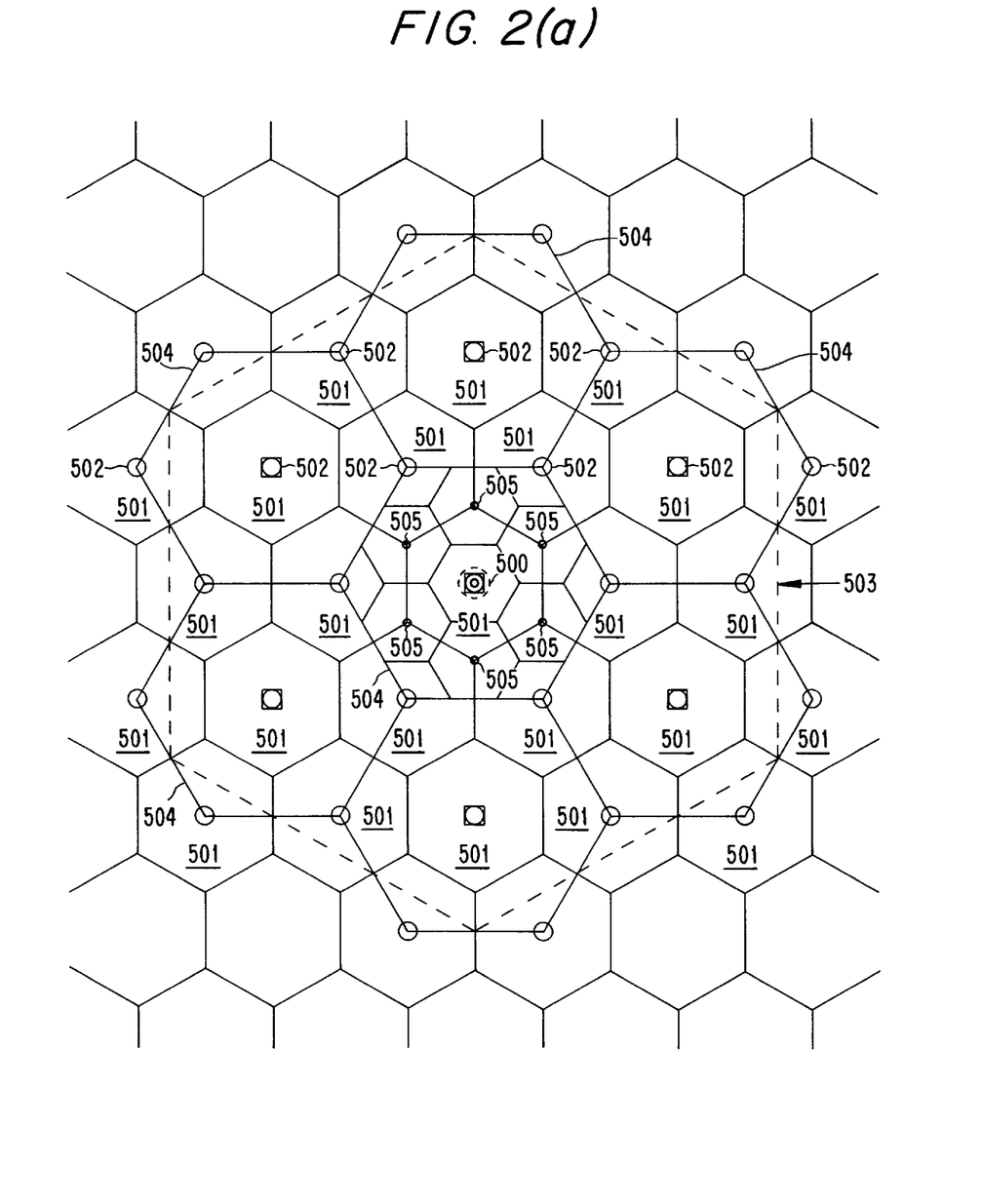
FIG. 2A illustrates an exemplary cellular radiocommunication system layout in which a digital system overlays an analog system.

Consider the exemplary system shown in FIG. 2. Therein, each of the hexagons 501 represent cells in an analog system having associated centers 502 at which base stations can be located. A digital overlay network having larger cells has been introduced to the analog network, one such cell being depicted by dashed line 503. The associated base station site of this digital cell is at the center 500 where it coincides with an existing analog base station 502. When the communication traffic associated with mobile stations having digital capabilities increases, then the large digital cell 503 may be split into smaller cells 504 which use existing base station sites 502 of the analog cells. Additional digital cell splitting can be accomplished by adding new base stations, this concept being illustrated by sites 505 within the central cell 504.

To simplify the following description of exemplary embodiments of the present invention, reference will be made to a simplified version of this system shown in FIG. 2B. Therein, a single base station 500 is shown at the center of an analog cell 501 and a digital cell 504. The single base station 500 has the necessary equipment to support radiocommunication services within both cells 501 and 504. A dual-mode mobile station MS is illustrated at an initial position within the boundaries of both cells 501 and 504.

In this exemplary hybrid system, the analog and digital cells support radiocommunication service by way of analog traffic and control channels, and digital traffic and control channels, respectively. When in the idle mode, i.e., when the mobile station MS is not currently involved in a call, it listens to a control channel for paging messages which are sent by the base station 500 when a call is to be put through to that mobile station. Similarly, when the mobile station user wishes to place a call, a message is transmitted over the control channel requesting that a traffic channel be allocated for the call. For the purposes of the present invention, the mobile station MS can be listening to (and communicating over) either an analog or a digital control channel prior to call-setup.

As mentioned above, the conventional process for allocating a traffic channel to a dual-mode mobile station at call-setup is to allocate a digital traffic channel when available and otherwise an analog traffic channel. According to the present invention, however, another constraint may be imposed on the allocation of a digital traffic channel to the dual-mode mobile station MS. This additional constraint will now be described with reference to FIG. 3. Therein, at block 600, a decision is made to allocate a traffic channel to mobile station MS. Then, the received signal strength measured by the serving base station of the mobile station's transmitted signals on the control channel is compared with a predetermined threshold for digital call-setup at block 602, which threshold is referred to herein as "$SS_{Call-setup}$". If the measured signal strength exceeds $SS_{Call-setup}$, then a digital traffic channel will be allocated to mobile station MS by base station 500 at block 604. Otherwise, if the measured signal strength is less than or equal to $SS_{Call-setup}$, an analog traffic channel will be allocated (if available) to mobile station MS by base station 500 at block 606. These comparisons can be made in the land system at either the base station 500 or, if the measurements are reported, at the switch (not shown in FIG. 2B). The predetermined threshold $SS_{Call-setup}$ can be selected, for example, based upon historical data which indicate, among other things, the resulting connection failure rate for digital traffic channels. Thus, the boundaries of cell 504 are effectively shifted inwardly to increase connection reliability to whatever degree is desired by the system designer or system operator.

Exemplary embodiments according to the present invention can also impact the decision making process for allocating traffic channels to connections which are being handed off. Referring again to the example shown in FIG. 2B, suppose that mobile station MS is currently connected to base station 500 via an analog traffic channel. Also suppose that mobile station MS moves from its illustrated position to a new position X pointed to by the arrow. In so doing, the mobile station MS has crossed the boundary of analog cell 501, which will likely trigger a handoff as the signal strength and/or quality on the connection degrades below a handoff threshold. The land system has the option of handing off the connection to another analog traffic channel or to a digital channel, i.e., a channel supported by a neighboring cell not shown in FIG. 2B. According to exemplary embodiments of the present invention, handoff decisions can be made in accordance with the method described by the flowchart of FIG. 4.

Figure 4:
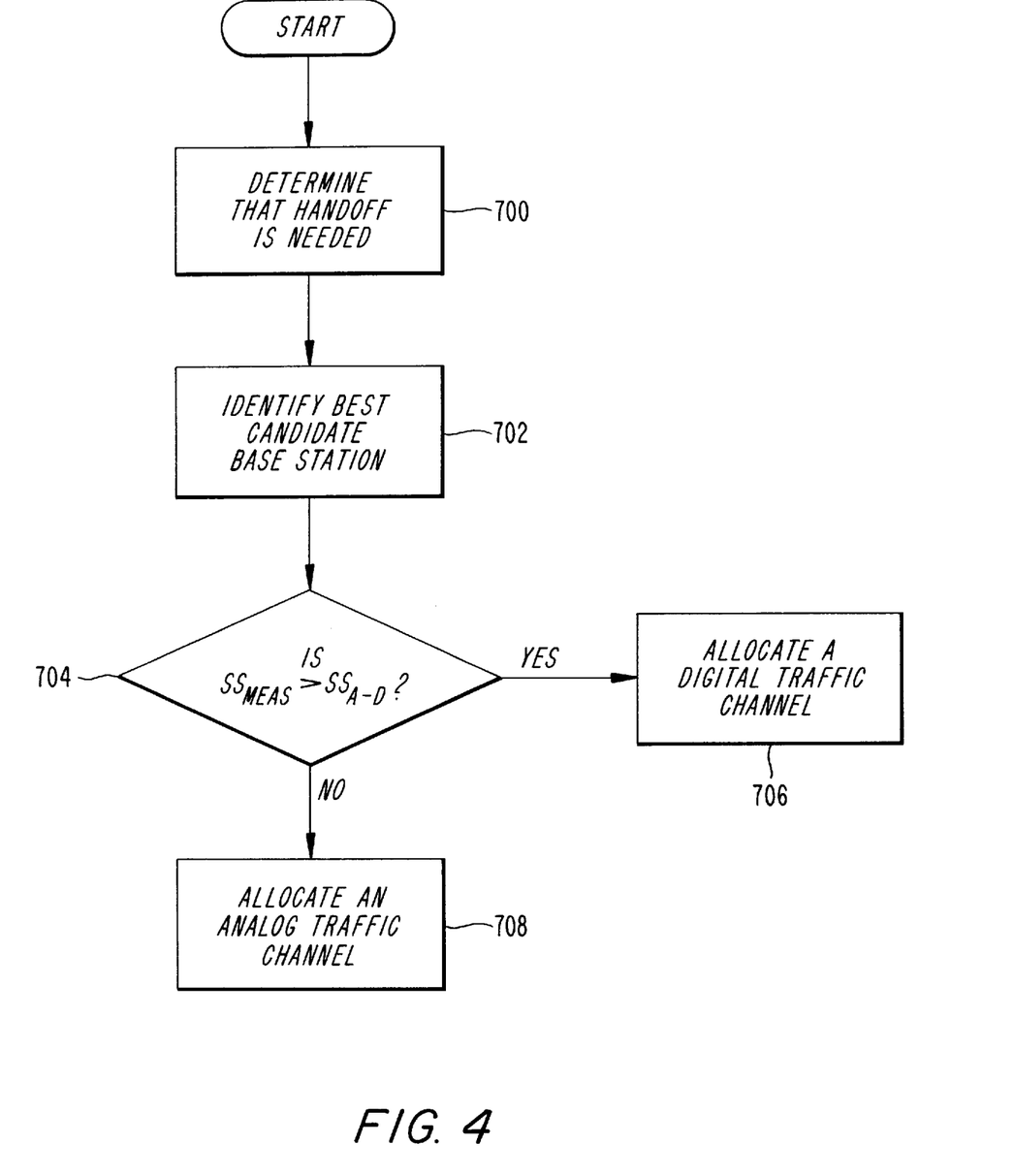
FIG. 4 is a flowchart depicting a handoff method according to an exemplary embodiment of the present invention.

Therein, a decision is made by the land system that a handoff is needed at block 700. This decision can be taken in accordance with known techniques, e.g., if the signal strength and/or quality of the connection provided to mobile station MS by base station 500 on the analog traffic channel moves below a threshold level. Thereafter, at block 702, the land system identifies a best candidate base station for servicing the mobile station MS after the handoff, again using conventional techniques. For example, the land system can request measurements of the signal strength received by each of the base stations neighboring base station 500. The neighboring base station which most strongly receives the MS's transmissions on the analog traffic channel can be identified as the candidate or target base station for the handoff, if its received signal strength exceeds a first threshold. This first threshold is established to add a hysteresis factor designed to prevent multiple handoffs of a mobile station between base stations when the mobile station travels near cell borders (which is commonly referred to as a "ping-pong" effect).

Subsequent to identifying the appropriate neighbor base station for handoff, the signal strength measured by the identified candidate base station on the analog traffic channel is compared (at block 704) with a second threshold for handoffs from analog traffic channels to digital traffic channels, referred to herein as "$SS_{A\text{-}D}$". If the measured signals strength ($SS_{Meas}$) exceeds $SS_{A\text{-}D}$, then handoff will be made to a digital traffic channel at block 706. Otherwise, if $SS_{Meas}$ is equal to or less than $SS_{A\text{-}D}$, then an analog traffic channel will be allocated (if available) at block 708 to continue support of the connection from the identified base station. Traffic that has been routed to an analog channel may later be routed to a digital traffic channel when $SS_{A\text{-}D}$ is exceeded. Like $SS_{Call\text{-}setup}$, the predetermined threshold $SS_{A\text{-}D}$ can be selected by a system designer or by an operator so that the connection failure rate for handing off between an analog traffic channel and a digital traffic channel is determined by the system designer or the system operator rather than in an uncontrolled manner resulting from the handover techniques, system geography and other factors.

If desired, handoffs between digital traffic channels can also be made subject to a minimum received uplink signal strength, referred to herein as "$SS_{D\text{-}D}$". The same process described with respect to FIG. 4 can be implemented for this case, but with a different predetermined threshold $SS_{D\text{-}D}$.

The actual values selected for the predetermined thresholds may vary from system to system based upon the measured impact of these thresholds under actual traffic conditions, which impact can be estimated in advance by using simulations or performance measurements. As a general guideline, however, the system designer or operator should recognize that by establishing the afore-described constraints against the allocation of digital traffic channels in geographic areas which provide both analog and digital service, there is a general risk that analog traffic will accumulate. Moreover, if $SS_{D\text{-}D}$ is made too high, then the result might be double or triple handoffs (e.g., first a D-A handoff, followed by an A—A handoff and then an A-D handoff), which is an inefficient use of system resources. Conversely, if the constraint on $SS_{A\text{-}D}$ is too low, then the analog to digital success rate will not improve. This highlights the benefits associated with having different thresholds for digital to digital versus analog to digital handoffs.

According to other exemplary embodiments of the present invention, one or more of the above-described predetermined thresholds may be omitted to reduce the complexity of those embodiments. For example, $SS_{Call\text{-}setup}$ can coincide with $SS_{A\text{-}D}$ instead of being a separate threshold as described above. This represents a design tradeoff between complexity (i.e., the more decision parameters, the more complex) and the unnecessary setup of analog traffic (i.e., where otherwise independent values would follow the relation $SS_{A\text{-}D} > SS_{Call\text{-}setup}$). In the same way, $SS_{A\text{-}D}$ and $SS_{D\text{-}D}$ can be jointly specified, however separate values for these thresholds is desirable for systems where the connection failure rate for these cases is widely disparate. Alternatively, a system designer or operator might specify $SS_{A\text{-}D}$ but not $SS_{D\text{-}D}$ (i.e., avoiding uplink signal strength restrictions for handoffs to a digital traffic channel from a digital traffic channel) to avoid the possibility of additional handoffs described above.

According to other exemplary embodiments of the present invention, the predetermined thresholds can be varied by the system operator to accommodate changes which impact on the connection failure rate. For example, if the rate of connection failures for digital traffic channels decreases due to improvements in synchronization techniques, then the thresholds can also be changed accordingly (e.g., by decreasing $SS_{A\text{-}D}$ and $SS_{Call\text{-}setup}$. These changes can be made manually by the system operator based upon empirical connection failure measurements or automatically by the system based upon target failure rates versus measured failure rates.

If a threshold for selecting a digital traffic channel for a particular traffic case is not exceeded in a first (i.e., best) candidate cell, and no analog traffic channels are available in that cell, then the system would turn to the second candidate cell on the list. If an analog channel in this second cell is available and fulfills the handoff criteria, it would be selected to handle the connection, and so on. If no analog channels fulfilling the handoff criteria are available, then the system could for example wait until some channel (digital or analog) fulfills the connection criteria.

If the threshold for selecting a digital traffic channel at call start is not exceeded, and no analog traffic channels are available in the connection cell, then the system may, depending on the operator's preferences, for example disable $SS_{Call\text{-}setup}$ in which case a digital channel would be allocated if the original access criterion is satisfied. Alternatively, the system may for example deny service (congestion). Another possibility would be to utilize a different value for $SS_{Call\text{-}setup}$ in this case.

Figure 2B:
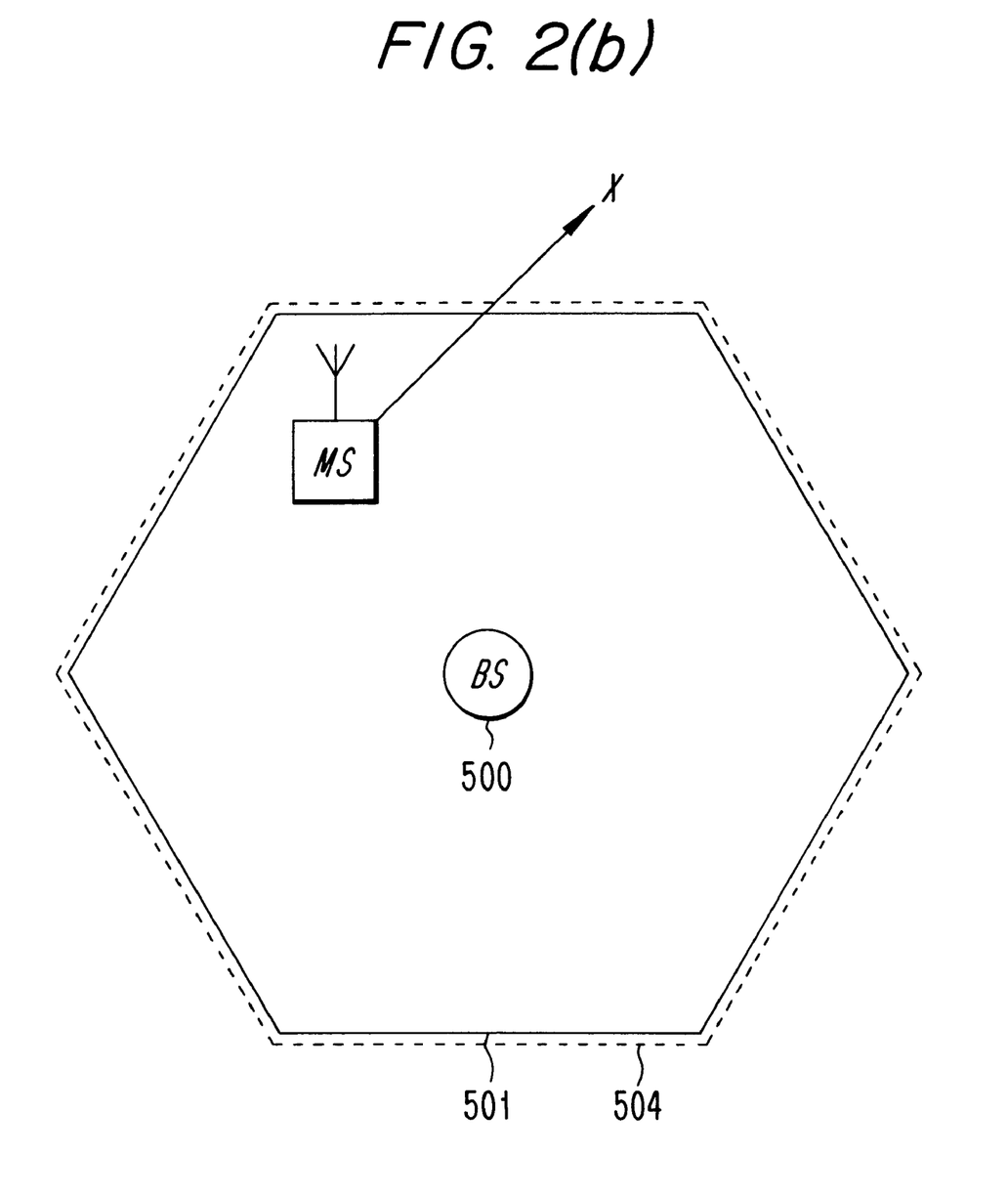
FIG. 2B illustrates a portion of the system of FIG. 2A used to describe exemplary embodiments of the present invention.
Figure 3:
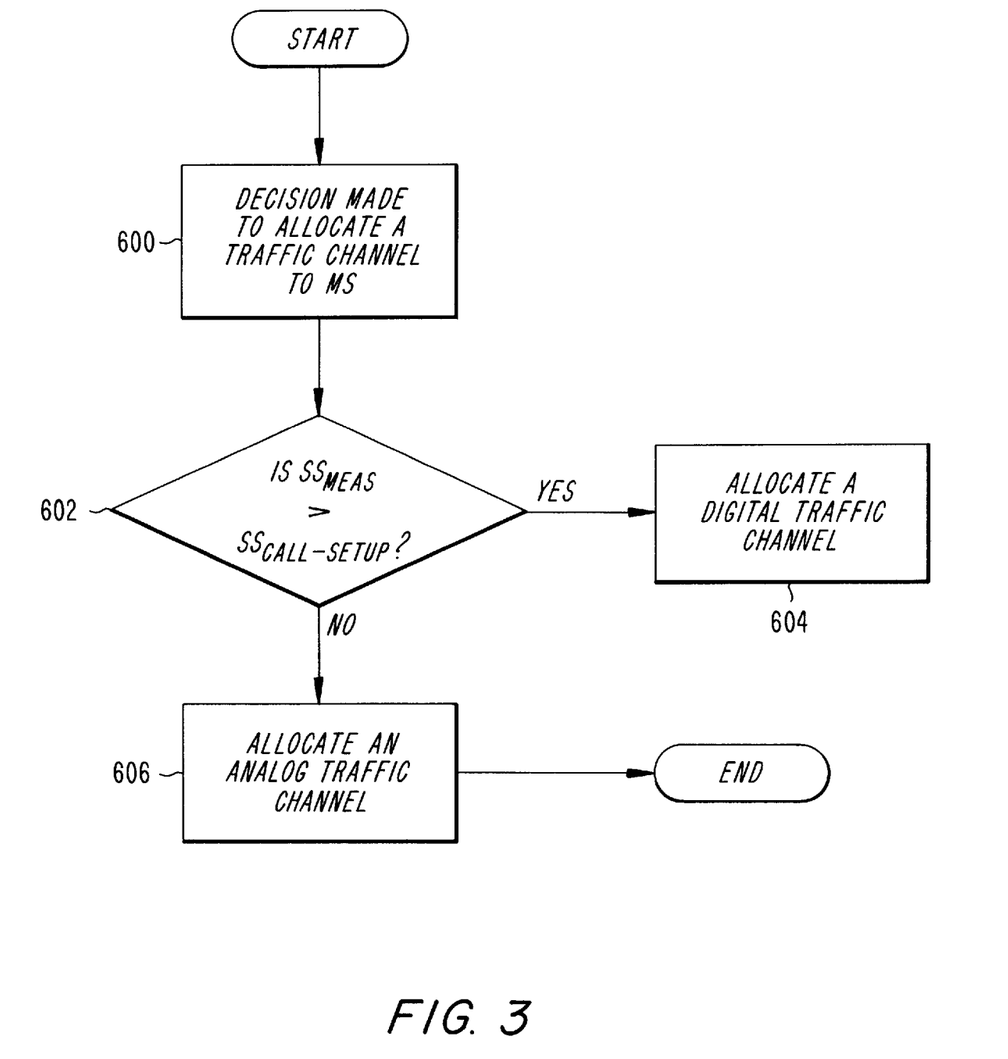
FIG. 3 is a flowchart illustrating a call-setup method according to an exemplary embodiment of the present invention.

The examples provided above and described with respect to FIG. 2B are based on the situations where the digital base stations and the analog base stations are co-located. However, those skilled in the art will appreciate that the present invention is equally applicable to cases where the analog and digital base stations are not co-located. In such cases, the list of candidate base stations for handover or call-setup would include both analog and digital base stations. If no digital base stations meet the uplink signal strength criteria, e.g., for handoff, then the system would turn to the analog base station candidates. If no analog traffic channels are available, then the system could, for example, wait until the best digital base station candidate meets the uplink signal strength criteria.

The above-described exemplary embodiments are intended to be illustrative in all respects, rather than restrictive, of the present invention. If other types of traffic situations arise, system designers may choose to implement other thresholds which take these other types of traffic situations into account. For example, if mobile assisted channel allocation (MACA) techniques are supported by a system, such techniques may improve call-setup failure rates to digital traffic channels as compared with systems in which MACA is not supported. Thus, it may be desirable to provide two different threshold values for $SS_{Call\text{-}setup}$.

Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for allocating a traffic channel to a mobile station at call set-up in a radiocommunication system having both analog traffic channels and digital traffic channels, the method comprising the steps of:
   measuring, at a base station, a signal strength received from said mobile station on a control channel;
   determining if said measured signal strength exceeds a first threshold sufficient to permit communication between said base station and said mobile station;
   if so, allocating a digital traffic channel to said mobile station if said measured signal strength exceeds a second threshold wherein said second threshold is higher than said first threshold; and
   otherwise, allocating an analog traffic channel to said mobile station.

2. The method of claim 1, wherein said control channel is an analog control channel.

3. The method of claim 1, wherein said control channel is a digital control channel.

4. The method of claim 1, further comprising the step of:
   varying said second threshold.

5. A method for handing off a connection established between a mobile station and a currently serving base station on a current traffic channel to another traffic channel, the method comprising the steps of:
   measuring an uplink signal strength at which said mobile station is transmitting on said current traffic channel;
   determining if said measured uplink signal strength exceeds a first threshold;
   selecting a digital traffic channel as said another traffic channel if said measured uplink signal strength exceeds a second threshold greater than said first threshold;
   otherwise, selecting an analog traffic channel as said another traffic channel if said measured uplink signal strength fails to exceed said second threshold; and
   handing off said connection to said selected another traffic channel.

6. The method of claim 5, wherein said current traffic channel is an analog traffic channel.

7. The method of claim 5, wherein said current traffic channel is a digital traffic channel.

8. The method of claim 5, further comprising the steps of:
   varying said second threshold.

9. A system for allocating a traffic channel to a mobile station at call set-up in a radiocommunication system having both analog traffic channels and digital traffic channels, the system comprising:
   means for measuring, at a base station, a signal strength received from said mobile station on a control channel;
   means for determining if said measured signal strength exceeds a first threshold sufficient to permit communication between said base station and said mobile station;
   means for allocating a digital traffic channel to said mobile station if said signal strength exceeds a second threshold greater than said first threshold; and
   means for allocating an analog traffic channel to said mobile station if said signal strength fails to exceed said second threshold.

10. The system of claim 9, wherein said control channel is an analog control channel.

11. The system of claim 9, wherein said control channel is a digital control channel.

12. The system of claim 9, further comprising:
   means for varying said second threshold.

13. A system for handing off a connection established between a mobile station and a currently serving base station on a current traffic channel to another traffic channel, the system comprising:
   means for measuring an uplink signal strength at which said mobile station is transmitting on said current traffic channel;
   means for determining if said measured uplink signal strength exceeds a first threshold;
   means for selecting a digital traffic channel as said another traffic channel if said measured uplink signal strength exceeds a second threshold greater than said first threshold;
   means for selecting an analog traffic channel as said another traffic channel if said measured uplink signal strength fails to exceed said second threshold; and
   means for handing off said connection to said selected another traffic channel.

14. The system of claim 13, wherein said current traffic channel is an analog traffic channel.

15. The system of claim 13, wherein said current traffic channel is a digital traffic channel.

16. The system of claim 13, further comprising the steps of:
   means for varying said second threshold.

17. A method for handing off a connection from an analog traffic channel comprising the steps of:
   providing a first signal strength threshold for evaluating handoffs from said analog traffic channel to another analog traffic channel;
   providing a second signal strength threshold for evaluating handoffs from said analog traffic channel to a digital traffic channel; and
   handing off said connection from said analog traffic channel to said digital traffic channel if a measured uplink signal strength exceeds said second signal strength threshold wherein said second threshold is higher than said first threshold.

18. The method of claim 17, further comprising the step of:
   otherwise, handing off said connection to said another analog traffic channel if said measured uplink signal strength exceeds said first signal strength threshold.

19. A method for handing off a connection from a first digital traffic channel to a second digital traffic channel comprising the steps of:

measuring an uplink signal strength on said first digital traffic channel;

determining if said measured uplink signal strength exceeds a first threshold; and handing off said connection to said second digital traffic channel if said measured uplink signal strength exceeds a second threshold greater than said first threshold.

20. The method of claim 19 further comprising the step of;

otherwise, handing off said connection to an analog traffic channel.

\* \* \* \* \*